United States Patent [19]
Iida

[11] 3,746,435
[45] July 17, 1973

[54] CINECAMERA AUTOMATIC FADING DEVICE

[75] Inventor: Yozo Iida, Tokyo, Japan
[73] Assignee: Nippon Kogaku K.K., Tokyo, Japan
[22] Filed: Nov. 30, 1971
[21] Appl. No.: 203,184

[30] Foreign Application Priority Data
Dec. 4, 1970 Japan.............................. 45/120291

[52] U.S. Cl. ................................................. 352/91
[51] Int. Cl. .......................................... G03b 21/36
[58] Field of Search ....................................... 352/91

[56] References Cited
UNITED STATES PATENTS
| | | | |
|---|---|---|---|
| 3,677,625 | 7/1972 | Stolzenwald et al. | 352/91 |
| 3,545,852 | 12/1970 | Winkler et al. | 352/91 |
| 3,549,249 | 12/1970 | Katsuyama | 352/91 |

*Primary Examiner*—Samuel S. Matthews
*Assistant Examiner*—Russell E. Adams, Jr.
*Attorney*—Joseph M. Fitzpatrick, John Thomas Cella et al.

[57] ABSTRACT

An automatic fading device in a cinecamera comprises an electric motor for driving the device to gradually open and close a shutter opening. In the circuit of the motor there is connected at least one switch consisting of two contacts normally closed together by a resilient member. A movable member is provided to force one of the switch contacts into an open position with respect to the other contact when the movable member has closed the shutter opening. A fading operation member is provided to force the said other contact into a closed position with respect to the said one contact when the fading operation member has been moved to its fade-in position.

3 Claims, 4 Drawing Figures

3,746,435

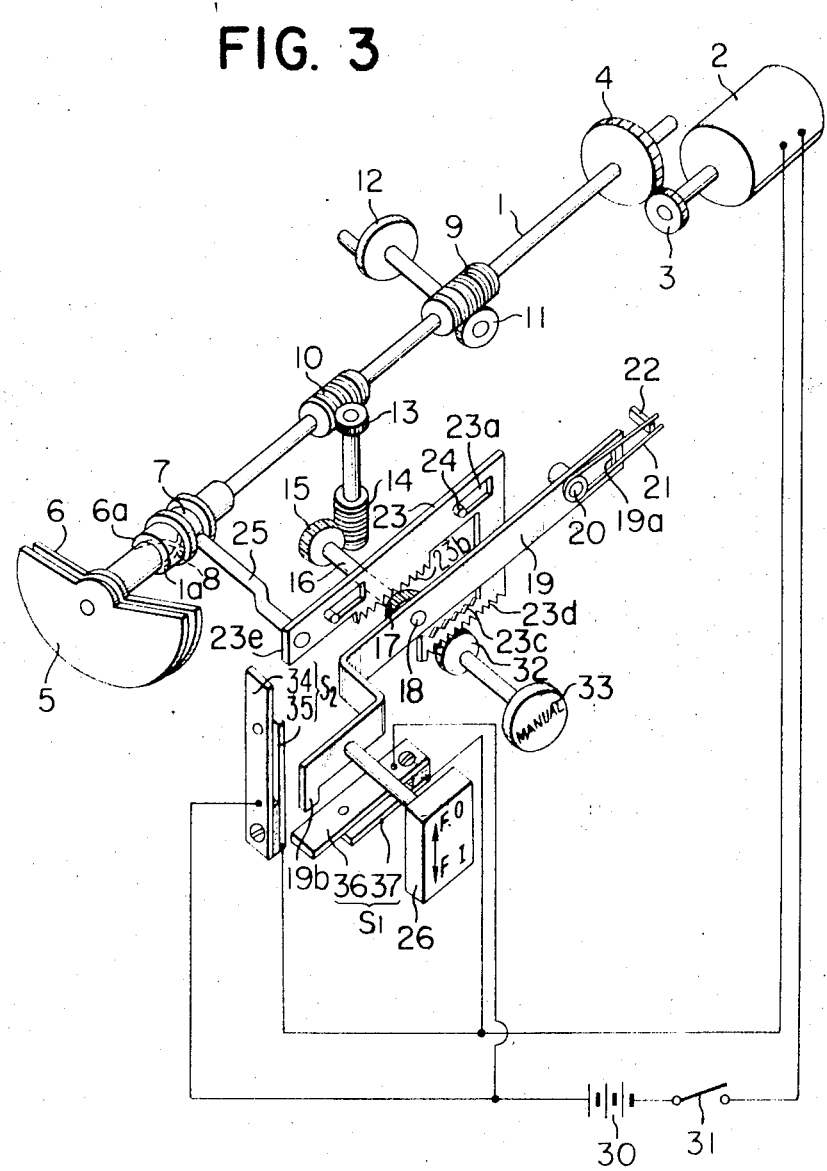

CINECAMERA AUTOMATIC FADING DEVICE

BACKGROUND OF THE INVENTION

1. Field of the Invention

This invention generally relates to an automatic fading device for use in a cinecamera, such as a compact cinecamera, and more particularly to such a device in which a driving motor circuit is cut off during a fade-out cycle or when the fading device has fully closed an aperture, thereby preventing film from being uselessly fed while the aperture is fully closed, and enabling an automatic fade-in cycle to immediately follow the termination of the fade-out cycle.

2. Description of the Prior Art

In photographic techniques of this type, it has already been proposed manually to operate a fading device for a fade-out cycle and thereafter to stop the feeding of film or cut off a driving motor circuit. However, fade-ins and fade-outs accomplished by such technique have involved adjustment of the quantity of photographing light by manual operation of a variable opening shutter or filter, and the adjustment of the quantity of light at a predetermined rate for fading operations has encountered much difficulty and has proven cumbersome. Furthermore, for a fade-in mode, a switch in the motor circuit must be shifted from a fade-out mode, in which the motor circuit is cut off, to a closed position by manual operation of a control knob. In addition, certain idle means must be provided to nullify the quantity of light passing through the shutter opening or filter during the aforesaid shift between open and closed positions, and this has been accompanied by much difficulty and onerous procedures both in design and operation.

SUMMARY OF THE INVENTION

It is an object of the present invention to eliminate the foregoing difficulties and disadvantages in the design and operation of the conventional fading device. Thus, a fading device is provided which enables the quantity of light to be adjusted at a predetermined rate by a variable opening shutter or filter in response to the rotation of the shutter; to provide for a motor circuit which is cut off to prevent useless film feeding upon completion of a fade-out; and, when the variable opening shutter is in its fully closed position, or when a switch in the motor circuit is opened by an associated member of the fading device, to force the switch into its closed position by a fading operation member so as to allow a fade-in cycle to immediately follow the fade-out.

According to another aspect of the present invention, there is provided a fading device of the described type in which a motor circuit is cut off to prevent useless film feeding upon completion of a fade-out and when the variable opening shutter is in its fully closed position, or when a switch in the motor circuit is opened by an associated member of the fading device, another switch parallel with the first-named switch in the motor circuit is closed by a fading operation member so as to allow a fade-in cycle to immediately follow the fade-out with the first-named switch maintained open.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

BRIEF DESCRIPTION OF THE DRAWINGS

A specific embodiment of the invention has been chosen for purposes of illustration and description, and is shown in the accompanying drawings, forming a part of the specification wherein:

FIG. 3 is a combined perspective view and circuit diagram of the automatic fading device according to a second embodiment of the present invention.

DESCRIPTION OF THE PREFERRED EMBODIMENTS

Figure 1:
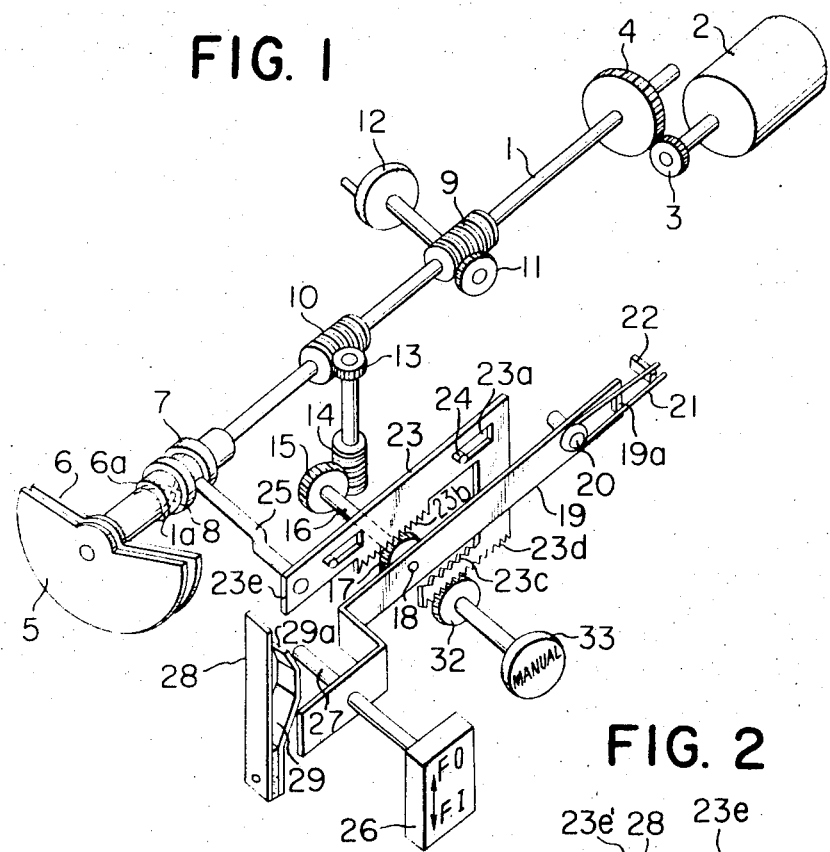
FIG. 1 is a perspective view of the automatic fading device according to a first embodiment of the present invention.
Figure 2:
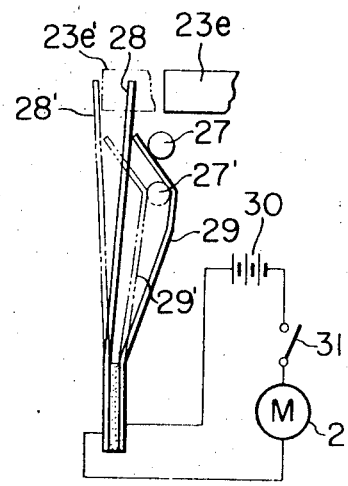
FIG. 2 is a diagram of the motor circuit in the device of FIG. 1, showing the manner in which the circuit is changed over from a fade-out mode to a fade-in mode.

Referring to FIGS. 1 and 2, a shutter shaft 1 is rotatably mounted in respect of the camera body (not shown) and may be rotated by a driving motor 2 via a motor gear 3 engaged with a shutter gear 4, which is mounted on the shutter shaft on one end thereof. At the other end of the shutter shaft 1, there are mounted variable opening shutter sectors 5 and 6 of known type. A sleeve 7, integrally formed with the shutter sector 6, is axially movable on the shutter shaft 1 and has a pin 8 and lead grooves 1a and 6a formed thereon. The sleeve 7 may be axially moved on the shutter shaft 1 by known means so that the shutter sectors 5 and 6 may be rotated in opposite directions by cooperation between the pin 8 and the shutter shaft 1 and the lead grooves 1a, 6a, thereby varying the degree of the shutter opening. The sleeve 7 may also be stopped always at a predetermined position by known means, and it is further associated with a film feeding pawl means (not shown) to transport a film during a shutter operation. The shutter shaft 1 also carries thereon a shutter worm 9 and a worm 10 for rotation therewith. The shutter worm 9 is adapted to transmit the drive of the shutter shaft to a take-up gear 11, integral with a film take-up spool 12, in known manner. A worm wheel 13 engages the worm 10 for rotation therewith and is connected to a worm 14 by a common shaft which is journalled to a fixed portion of the camera body. The worm 14 is engaged with a worm wheel 15 which is, in turn, connected by a shaft 16 to a clutch pinion 17. The clutch pinion 17 is journalled to an operating lever 19 by means of a pin 18; and the operating lever 19 is pivotally mounted on a fixed portion of the camera body, as by pivot pin 20, and has a projection 19a formed at the right end thereof, as viewed in FIG. 1. A torsion spring 21 is wrapped around the pivot pin 20 and its elogated arms hold therebetween the projection 19a and another projection 22 which is extended from a fixed portion of the camera body, so as to keep the operating lever 19 in its neutral position; that is, to keep the clutch pinion 17 out of engagement with either of racks 23b or 23c formed in a rack plate 23. The rack plate 23 is slidably mounted with respect to a fixed portion of the camera body by means of guide slot 23a formed therein to cooperate with a pin 24 extended from a fixed camera body portion, and has a further rack 23d beneath the rack 23c. The rack plate 23 has a studded pin 25 at the left end thereof, and through this pin 25 the rack plate 23, when sliding, may increase or decrease the opening of the variable opening shutter sectors at a predetermined rate, thereby to accomplish a fade-out or a fade-in. The adjustment of the shutter opening is such that the degree of the opening is decreased with the leftward displacement of the rack plate 23, as viewed in FIG. 1. When the rack plate 23 slides leftwardly to complete a fade-out cycle, the leftmost end 23e of the rack plate 23 may push a motor circuit switch contact 28 to open the motor circuit and thereby stop the motor 2 from rotating.

The operating lever 19 is provided with a fading operation member 26 operable from outside the camera body. This fading operation member 26 has an elongated rod 27 which is extended from the member 26 to pass through the left end portion of the lever 19 and is adapted to force a switch contact 29 into engagement with the other switch contact 28 from the open position of these two contacts brought about by the rack plate 23 during the fade-out cycle.

As shown in FIG. 2, the motor circuit includes a power source such as storage battery 30 and a start switch 31. A pinion 32 (FIG. 1) is in engagement with the lowermost rack 23d of the rack plate 23 and is driven by manually operated knob 33 provided outwardly of the camera body.

The operation and effect of the above-described embodiment will now be described.

A. Normal photography

For normal photography, the variable opening shutter is maintained fully open with the switch contacts 28, 29 of the motor circuit being closed (see FIG. 2). When the start switch 31, operatively associated with a shutter button (not shown) is closed, the motor 2 starts revolution which actuates the shutter shaft 1, unshown film feeding pawl means, and film take-up spool 12 to take up the film for normal photography.

B. Fade-out

In the course of, or at the beginning of normal photography, the fading operation member 26 is raised agaisnt the force of the torsion spring 21 and thereby the operating lever 19 is pivoted clockwise about the pin 20 to bring the clutch pinion 17, rotatably supported on the lever 19, into engagement with the rack 23b, so that the drive from the motor 2 is transmitted to the rack plate 23 through the shutter shaft 1 and the train comprising gears 10–13–14–15 and shaft 16. Due to the engagement between the clutch pinion 17 and the rack 23b, the rack plate 23 is moved leftwardly, as viewed in FIG 1, so that the pin 25 of the rack plate 23 moves the sleeve 7 also leftwardly, thereby actuating the variable opening shutter at a predetermined rate from its fully open position to its fully closed position to effect a fade-out shot. When the variable opening shutter is fully closed, the leftmost end 23e of the rack plate 23 forces the switch contact 28 out of engagement with the switch contact 29 in the motor circuit, to thereby stop the motor and accordingly, all the parts driven therefrom. Thus, any useless film feeding may be prevented in the fully closed shutter position.

The fade-out operation may be manually made also by rotating the knob 33 and therefore the pinion 32 to fully close the variable opening shutter and to disengage the switch contact 28 from the motor circuit switch contact 29.

C. Fade-in

After the termination of a fade-out cycle, the fading operation member 26 is then depressed against the force of the torsion spring 21 to pivot the lever 19 counterclockwise about the pin 20 and bring the clutch pinion 17 into engagement with the rack 23c and substantially at the same time the projected rod 27 of the fading operation member 26 causes the switch contact 29 to follow and engage the switch contact 28 which has just been opened by the rack plate 23 (see 23e', 27', 28' and 29' in FIG. 2). Thus, the motor circuit is closed. The start switch 31 is then closed to rotate the motor 2 and in response thereto, the variable opening shutter shifts from its fully closed position to its fully open position to increase the quantity of photographing light at a predetermined rate and thereby permit a fade-in shot to occur.

In the described embodiment of the present invention, the motor circuit is so-arranged as to be directly closed and opened, but in the construction of the type in which a shutter stopper is actuated by a magnet or the like for remote control, it is, of course, possible to modify the arrangement so that a trigger switch in the magnet circuit is closed and opened instead of the motor circuit.

Referring now to FIG. 3, there is shown another embodiment of the present invention. This alternate embodiment deffers from the previously illustrated one in that a switch $S_1$ comprising contacts 36 and 37 is provided in addition to a switch $S_2$ comprising contacts 34 and 35. The switch $S_1$ is normally open and is connected in parallel with the switch $S_2$, contact 34 of switch $S_2$ being connected to contact 36 of switch $S_1$; and contact 35 of switch $S_2$ being connected to contact 37 of switch $S_1$; both switches $S_1$ and $S_2$ being wired to the motor 3, as shown. When the fading operation member 26 is depressed for a fade-in operation, the left end 19b of the operating lever 19 pushes the contact 36 of the switch $S_1$ to close the same. All the other parts of the present embodiment are similar to those of the previous embodiment, although some of them such as storage battery, start switch, pinion engaged with the rack 23d, and manually operated knob are indicated by numerals 30, 31, 32 and 33, respectively.

The operation of the embodiment shown in FIG. 3 will be described hereunder.

A'. Normal Photography

For normal photography, the variable opening shutter is maintained fully open with one of the motor circuit switches $S_2$ being closed. When the start switch 31 operatively associated with a shutter button (not shown) is closed, the motor 2 starts revolution which actuates the shutter shaft 1, unshown film feeding pawl means, and film take-up spool 12 to take up the film for normal photography.

B'. Fade-out

In the course of, or at the beginning of normal photography, the fading operation member 26 is raised for a fade-out operation against the force of the torsion spring 21 and thereby the operating lever 19 is turned clockwise about the pivot pin 20 to bring the clutch pinion 17, rotatably supported on the lever 19, into engagement with the rack 23b, so that the drive from the motor 2 is transmitted to the rack plate 23 through the shutter shaft 1 and the train comprising gears 10-13-1-4-15 and shaft 16. Due to the engagement between the clutch pinion 17 and the rack 23b, the rack plate 23 is moved leftwardly, as viewed in FIG. 3, so that the pin 25 of the rack plate 23 moves the sleeve 7 also leftwardly, thereby actuating the variable opening shutter at a predetermined rate from its fully open position to its fully closed position to effect a fade-out shot. When the variable opening shutter is fully closed, the leftmost end 23e of the rack plate 23 forces the switch contact 34 out of engagement with the switch contact 35 to open the switch $S_2$ and thereby stop the motor from rotating. Accordingly, all the parts driven from the motor are also stopped. Thus, any useless film feeding may be prevented in the fully closed shutter position.

The fade-out operation may be manually made also by rotating the knob 33 and therefore the pinion 32 to fully close the variable opening shutter and to open the switch $S_2$.

C'. Fade-in

After the end of the fade-out cycle, the fading operation member 26 is then depressed against the force of the torsion spring 21 to bring the clutch pinion 17 into engagement with the rack 23c, i.e., into a fade-in position, and substantially at the same time, the projected rod 27 of the fading operation member 26 pushes the switch contact 36 of the other switch $S_1$ to close the same and accordingly, the motor circuit. The start switch 31 is then closed to energize the motor 2 and, in response to the rotation of the motor, the variable opening shutter shifts from its fully closed position to its fully open position to increase the quantity of photographing light at a predetermined rate and thereby permit a fade-in shot to occur.

Figure 4:
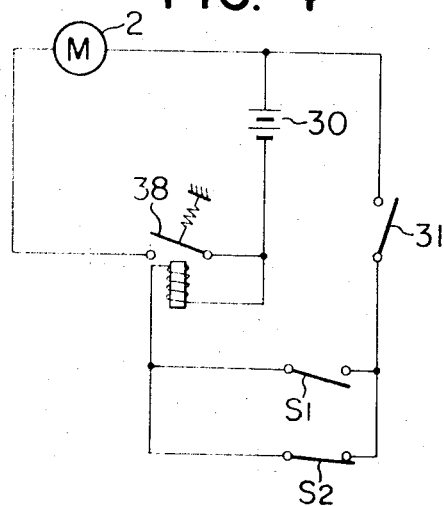
FIG. 4 is a circuit diagram showing a modification of the electric circuit in the device of FIG. 3.

In this embodiment, the motor circuit is again so-arranged to be directly closed and opened, but where the construction is such that a shutter stopper is actuated by a magnet or the like for remote control, it is possible to modify the arrangement so that a trigger switch 38 in the magnet circuit is closed and opened instead of the motor circuit, as shown in FIG. 4.

As will be appreciated from the foregoing description, the present invention not only prevents any useless film feeding during the fully closed shutter condition for a fade-out cycle, but also enables a motor switch to be automatically shifted from its open position to its closed position, with another motor switch, if any, maintained open, by the use of a fading operation member, without the necessity of taking care of the point of time at which the fully closed shutter position is reached during photographing, and without the need of any additional preparatory operation therefor. This leads to easier designing and elimination of cumbersome means or procedures in operation, as well as to greater ease in attaining the intended photographing operations.

I claim:

1. An automatic fading device for a cinecamera comprising:
    an electric motor;
    a circuit for energizing the electric motor;
    normally closed switching means provided in the circuit;
    shutter means for defining a film exposure opening;
    means for varying the film exposure opening by the rotation of said electric motor, engaged with the shutter means and manually movable among a neutral position in which the varying means is disconnected from the electric motor, said device being positionable between a first position in which the varying means is interconnected with the electric motor so as to vary the film exposure opening in the direction from the opened position to the closed position for a fade-out shot and a second position in which the varying means is interconnected with said electric motor so as to vary the film exposure in the direction from the closed position to the opened position for a fade-in shot;
    said varying means being biased to the neutral position thereof, said varying means having a member which moves into engagement with said switching means to open said circuit when the varying means is in the first position thereof and the exposure opening is closed, and means engaged with said switching means to close said circuit when the varying means is in the second position thereof and the exposure opening is closed.

2. An automatic fading device as claimed in claim 1, wherein:
    said switching means consists of first and second contacts which are biased to contact with each other and engageable with said varying means.

3. An automatic fading device for a cinecamera comprising:
    an electric motor;
    a circuit for energizing the electric motor;
    normally closed switching means provided in the circuit;
    shutter means for defining a film exposure opening;
    means for varying the film exposure opening by the rotation of said electric motor, engaged with the shutter means and manually movable among a neutral position in which the varying means is disconnected from the electric motor, said device being positionable between a first position in which the varying means is interconnected with the electric motor so as to vary the film exposure opening in the direction from the opened position to the closed position for a fade-out shot and a second position in which the varying means is interconnected with said electric motor so as to vary the film exposure in the direction from the closed position to the opened position for a fade-in shot;
    said varying means being biased to the neutral position thereof, engaged with said switching means to open said circuit when the varying means is in the first position thereof and the exposure opening is closed, and engaged with said switching means to close said circuit when the varying means is in the second position thereof and the exposure opening is closed, said switching means consisting of a first switch which is provided in the circuit and biased to close, and a second switch which is connected in parallel with said first switch and biased to open, said varying means being engaged with said first switch to open said circuit when the varying means is in the first position thereof and the exposure opening is closed and engaged with said second switch to close said circuit when the varying means is in the second position thereof and the exposure opening is closed.

* * * * *